Oct. 11, 1932.   P. GMELIN ET AL   1,881,490
PROCESS AND APPARATUS FOR THE SEPARATION OF GAS MIXTURES
Filed Dec. 27, 1929
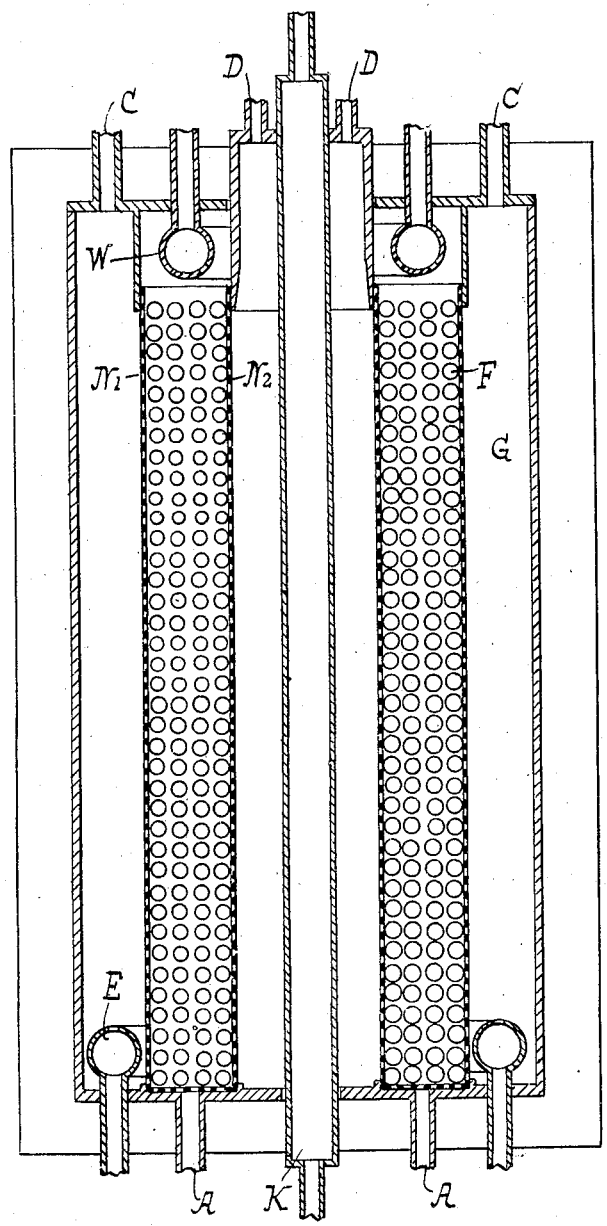
Inventors
Paul Gmelin
Adolf Knodel
By their Attorneys Patented Oct. 11, 1932

1,881,490

UNITED STATES PATENT OFFICE

PAUL GMELIN, OF MANNHEIM, AND ADOLF KNODEL, OF WOLFEN, GERMANY, ASSIGNORS TO I. G. FARBENINDUSTRIE AKTIENGESELLSCHAFT, OF FRANKFORT-ON-THE-MAIN, GERMANY

PROCESS AND APPARATUS FOR THE SEPARATION OF GAS MIXTURES

Application filed December 27, 1929, Serial No. 416,810, and in Germany December 31, 1928.

The present invention relates to a process and apparatus for the separation of gas mixtures by diffusion.

The economical separation of the single components from mixtures of gases or vapors is frequently of great importance industrially whether it be for the purpose of removing undesirable components or for the purpose of recovering the valuable components in a pure or a more or less concentrated form. The processes already known for this purpose, especially those which depend on the employment of a solvent for the component to be separated usually necessitate expensive and troublesome plants, and frequently lead to great losses of the solvent employed, especially when it is desired to recover valuable components from dilute mixtures. The processes which depend on the diffusion of the components to be separated through porous walls or by means of flowing assistant gases are likewise too costly, or in the case of the employment of assistant diffusing gases or vapors, the processes have the disadvantage that the said assistant gases or vapors are to be produced in a separate apparatus or must be compressed to produce the high speed of assistant gas necessary for carrying out the process.

We have now found that in many cases a far going separation of mixtures of gases or vapors may be effected in a very economical manner by contacting the gas mixture with a vaporous diffusing agent produced by evaporating a liquid in contact with the gas mixture and removing the vapor and the components of the gas mixture diffused therein from the evaporating liquid. In order to ensure good vaporization as great a surface as possible is imparted to the liquid, for example by allowing the preferably preheated liquid to trickle down over distributing bodies, disposed in the diffusion apparatus in a layer dividing the apparatus into two compartments, the gas mixture being passed along one side of said layer and the vapor and the components of the gas mixture diffused therein being withdrawn from the other side. The gas mixture to be separated is preferably also preheated to a temperature slightly above the temperature at which the liquid is vaporized. The removal of the vapor from the vaporizing liquid is preferably effected by the insertion of cooling means on which the vapor condenses whereby the vapor carries with it the components of the gas mixture diffused therein. The diffusion may be regulated by varying the temperature at which the liquid is vaporized, the pressure under which the gas mixture is supplied, and the pressure under which the vapor containing the components diffused therein, or, in case the vapor is condensed within the diffusion apparatus itself, the pressure under which the said diffused components are withdrawn. The pressures, however, under which the gas mixture is supplied on the one hand and under which the vapor containing the components diffused therein, or under which the said components themselves after condensation of the vapor, are withdrawn, should not differ very much from each other.

The nature of the invention will be further described with reference to the accompanying drawing which shows diagrammatically in vertical section an arrangement of apparatus according to this invention, but the invention is not restricted to this arrangement.

The gas mixture to be separated is introduced by means of a tubular ring E provided with orifices into the bottom of a cylindrical vessel G which is provided with a cooling tube K around which is a filling F consisting of clay balls, Raschig rings or the like and arranged in the form of a hollow cylinder. Onto the filling F which is held together by means of cylindrical casings $N_1$ and $N_2$ of wire netting or perforated sheet metal or the like, warm water for example is allowed to trickle from a supply apparatus W and this on its way from the top to the bottom of the filling F is partly vaporized, the non-vaporized portion flowing out through the passage A. On the one hand the velocity of flow or the pressure of the gas mixture introduced at E and on the other hand the amount and the temperature of the water trickling down, or the amount and temperature of the cooling medium flowing through the cooling tube K may be readily regulated so that the water vapor formed in the space F streams against the said tube K with such a velocity and is condensed thereon that it carries with it to the cooling tube a great part or the majority of that component of the gas mixture to be separated which diffuses more quickly into it. The gas which is thus removed from the region of the vaporizing water and which is freed from water vapor by streaming along past the cooling tube K is withdrawn through the passage D, while the component of the gas mixture which has not diffused is led through the tubes C.

In order to effect a sharp separation of the gas mixture it is frequently advantageous to impart a cyclonic movement to the introduced gas mixture or even to the non-diffused component which is flowing away, and this is preferably effected by means of supply and withdrawal tubes which are inclined to the vertical axis of the cylinder. In order to prevent any injurious influence of the streaming of the introduced gas mixture on the diffusion process it may be expedient to break up the stream into fine eddies by nets, deflecting plates and the like arranged in a suitable manner on the casing of the filling. A bundle of tubes or a tubular worm, preferably wound in a close spiral, may be employed instead of the cooling tube K. The freeing of the separated component from the vapor of the liquid may also be effected or assisted by adsorption or absorption of the vapor, for example by replacing the cooling tube by allowing a solid or liquid agent which will adsorb or absorb the vapor to trickle down or by arranging a layer of such an agent between the cooling apparatus and the vaporizing apparatus. The gas mixture to be separated is preferably heated to the temperature of the liquid to be vaporized or better still to a somewhat higher temperature. This can be effected in any suitable manner, for example by the employment of the heat of the gases and liquids leaving the apparatus which is recovered by heat exchange. This heat may also be employed for heating the liquid to be vaporized which is preferably led in a cycle.

If one operation is not sufficient, the process in accordance with the present invention may be readily carried out in a cycle or in several stages or by the employment of both these methods. The operation in stages is carried out so that the working conditions, such as temperature, velocity of flow of the gases and the liquid which is trickling down, or the kind of liquid are changed each time, and this is especially useful when it is desired to treat gas mixtures which have more than two components.

The process according to the present invention has proved very advantageous for example for the separation of mixtures of carbon monoxide and hydrogen, and among others may be mentioned the separation of acetylene and similar hydrocarbons from gases containing hydrogen and the freeing of industrial hydrogen from impurities such as argon, oxides of carbon, methane and the like.

The separation of such gas mixtures is rendered even more efficient when liquids which have a special dissolving power for one or more of the components to be separated are employed as the liquids to be vaporized. In many cases it is advantageous to employ the ordinary organic solvents, for example ether, alcohols, acetone, benzene and the like.

The objections peculiar to the processes already known, which can be traced back to the employment of thick layers of liquid and high pressures for dissolving the gases in the liquids, or to the great resistance and the danger of clogging when employing diffusion cells, are avoided by the process in accordance with the present invention. With a greater efficiency the new process requires only a small expenditure of energy and heat because the expensive compression operation is dispensed with and in most cases a comparatively low temperature suffices to evaporate sufficient amounts of vapour.

The following example will further illustrate how the invention is carried out in practice but the invention is not restricted thereto.

*Example*

A gas mixture consisting of 72 per cent of hydrogen and 28 per cent of nitrogen is passed at about atmospheric pressure through the apparatus described and shown having a capacity of 8 liters per minute and fed per minute with 12 cubic centimeters of water of 90° C. By passing the said gas mixture once through the apparatus a gas mixture consisting of 82 per cent of hydrogen and 18 per cent of nitrogen is obtained in a yield of 15 per cent of the initial gas mixture employed. The difference in pressure between the incoming and the issuing gas mixtures amounts to about 1 millimeter of a water column.

By passing the issuing gas mixture a second time through the apparatus under the same conditions a gas mixture of a hydrogen content of about 92 per cent is obtained in a yield of over 40 per cent.

By passing a gas mixture consisting of 25 per cent of carbon dioxide and 75 per cent of hydrogen through the apparatus under the same conditions a gas mixture consisting of 91 per cent of hydrogen and 9 per cent of carbon dioxide is obtained in a yield of 15 per cent.

When employing ethyl alcohol instead of water 15 per cent of a gas mixture consisting of 88 per cent of hydrogen and 12 per cent of carbon dioxide is obtained.

What we claim is:—
1. A process for the separation of gas mix- tures which comprises passing a gas mixture along one side of a layer of a trickling and vaporizing liquid and removing the vapor and the components of said gas mixture diffused therein from the other side of said layer, and separately withdrawing the remaining components of the gas mixture.

2. A process for the separation of gas mixtures which comprises passing a gas mixture along one side of a layer of a trickling and vaporizing liquid, condensing the vapor on the other side of said layer, removing the uncondensed gas having diffused into said vapors from the said other side of said layer, and separately withdrawing the remaining components of the gas mixture.

3. Apparatus for separating gas mixtures comprising a vessel, a vertically disposed layer of distributing bodies dividing said vessel into two compartments, means for supplying a liquid at the top of said layer, means for passing gases into one of said compartments and means for withdrawing gases from each of said two compartments.

4. Apparatus for separating gas mixtures comprising a vessel, a vertically disposed layer of distributing bodies dividing said vessel into two compartments, means for supplying a liquid at the top of said layer, means for passing gases into one of said compartments, a cooling device in the other compartment and means for withdrawing gases from each of said two compartments.

5. Apparatus for separating gas mixtures comprising a cylindrical vessel, a concentric vertically disposed layer of distributing bodies dividing said vessel into two compartments, means for supplying a liquid at the top of said layer, means for passing gases into the outer compartment and means for withdrawing gases from the inner and outer compartments.

6. Apparatus for separating gas mixtures comprising a cylindrical vessel, a concentric vertically disposed layer of distributing bodies dividing said vessel into two compartments, means for supplying a liquid at the top of said layer, means for passing gases into the outer compartment, a cooling device within the inner compartment and means for withdrawing gases from the inner and outer compartments.

In testimony whereof we have hereunto set our hands.

PAUL GMELIN.
ADOLF KNODEL.